Figure 1:
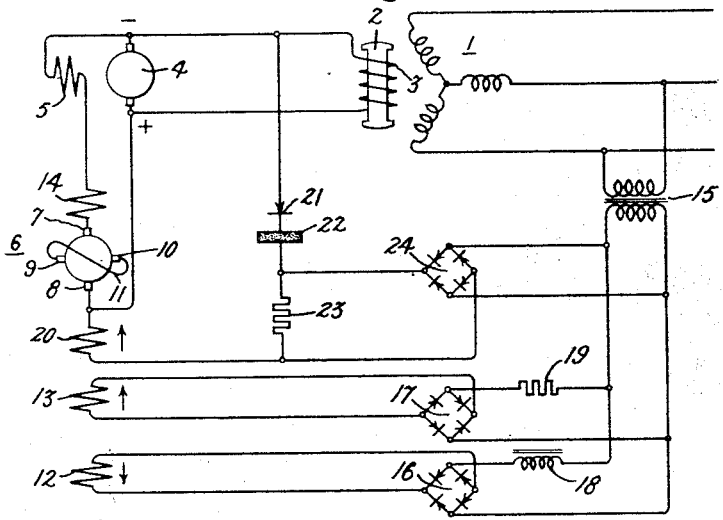

March 6, 1945.    S. B. CRARY    2,371,030
CONTROL SYSTEM
Filed April 5, 1943    2 Sheets-Sheet 1

Inventor:
Selden B. Crary.
by Harry E. Dunham
His Attorney.

Inventor:
Selden B. Crary,
by Harry E. Dunham
His Attorney.

Patented Mar. 6, 1945

2,371,030

UNITED STATES PATENT OFFICE 2,371,030

CONTROL SYSTEM

Selden B. Crary, Schenectady, N. Y., assignor to General Electric Company, a corporation of New York Application April 5, 1943, Serial No. 481,812

17 Claims. (Cl. 172—246)

This invention relates to control systems and more particularly to a new and improved automatic control system for dynamo-electric machines.

Of the many known types of dynamo-electric machines, the one to which my invention is especially adapted is the synchronous condenser. A synchronous condenser is a synchronous motor which is operated with little or no mechanical load. By definition, when it is normally excited at any particular voltage and load it operates at unity power factor, that is to say, it draws minimum current from its supply line. Overexcitation is excitation in excess of normal and can be caused by lowering the terminal voltage without actually raising the field current or raising the field current without changing the terminal voltage. It results in the condenser taking leading wattless current from its supply line. Likewise, underexcitation is excitation which is less than normal and can be caused by raising the terminal voltage without actually lowering the field current or lowering the field current without changing the terminal voltage. It results in the condenser taking lagging wattless current. Such a machine when it is provided with an automatic voltage regulator is often used to regulate the voltage of an alternating-current power line. Thus, if the voltage of the line increases above the setting of the automatic regulator, which ordinarily corresponds to the rated voltage of the condenser, the regulator will decrease the excitation of the condenser, thus causing it to draw greater amounts of lagging wattless current from the line and this lagging current in flowing through the line reactance will lower the line voltage. Conversely, a decrease in line voltage will make the regulator increase the condenser excitation with the result that leading wattless current is drawn through the line and thus the voltage of the line is raised.

Ordinarily zero excitation corresponds to the limit of the amount of lagging reactive power which the machine will take, but normal machine design is such that the value of lagging current at zero excitation is substantially less (usually 40% to 50%) than the full load current rating of the machine so that substantially greater amounts of leading reactive power can be obtained from the machine when it is overexcited. It has been found, however, that synchronous condensers having salient pole rotors have a substantial amount of reluctance synchronizing torque so that the excitation can actually be reversed or made negative without causing the condenser to lose synchronism and I have found that by means of such negative excitation a conventionally designed salient pole synchronous condenser can be made to draw from 50 to 67 percent more lagging reactive power than the amount of such power which corresponds to zero excitation. By negative excitation is meant reversed or negative field current but not reversed or negative rotor or field flux. When operating with lagging current a synchronous condenser's armature reaction is in the same direction as its positive excitation M. M. F. and negative excitation therefore bucks down the armature reaction M. M. F.

I have also found that the amount of negative excitation which may be applied up to the pull out point depends on the magnitude of the terminal voltage. The higher the terminal voltage the higher the reluctance torque which keeps the salient pole synchronous condenser in synchronism and therefore the greater may be the negative excitation of the condenser.

In accordance with the present invention there is provided a novel and simple automatic control system for synchronous condensers which provides for operation of the condenser with negative excitation and which also automatically limits the negative excitation so as to permit operation at maximum lagging reactive power consistent with stability. Furthermore, in its preferred form the invention is provided with means for varying the setting of the negative excitation limit in accordance with terminal voltage of the condenser so that maximum possible lagging reactive power may be obtained with stability and under varying conditions of terminal voltage. This latter feature will be seen to be important when it is remembered that it is the lagging reactive power drawn by the condenser which tends to hold down the voltage of the system and therefore the higher the system voltage rises the more lagging reactive power can be obtained from the condenser without causing it to lose synchronism.

An object of the invention is to provide a new and improved automatic control system.

Another object of the invention is to provide a new and improved automatic voltage regulator system for dynamo-electric machines.

A further object of the invention is to provide a novel negative excitation control system for salient pole synchronous condensers.

A still further object of the invention is to provide automatic means for biasing the negative excitation limit of a synchronous condenser in accordance with its terminal voltage.

The invention will be better understood from the following description taken in connection with the accompanying drawings and its scope will be pointed out in the appended claims.

Figure 2:
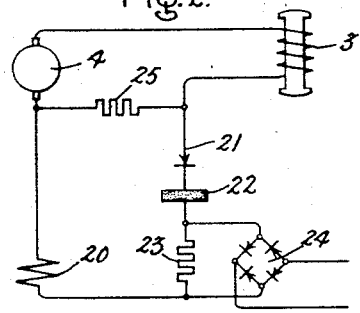

In the drawings Fig. 1 illustrates diagrammatically an embodiment of the invention, Fig. 2 is a partial view showing a modification, and Figs. 3 to 7 inclusive are diagrams for explaining the operation of the invention.

Referring now to Fig. 1, the invention is shown as applied to a three-phase synchronous condenser 1. This machine has a salient pole rotor 2 provided with a field winding 3 which is excited by means of an exciter 4. This is shown by way of example as a conventional self-excited direct-current generator having a shunt field winding 5. The voltage of the exciter 4 may be controlled in any suitable manner, such, for example, as by means of a compensated armature reaction excited buck and boost generator 6. This generator has a commutator provided with a pair of load axis brushes 7 and 8 and a pair of quadrature axis brushes 9 and 10 which are effectively short circuited by a conductor 11. For controlling the voltage between the load axis brushes, the machine 6 is provided with a pair of opposed control field windings 12 and 13, winding 12 being known as the lower or voltage lowering winding and winding 13 being known as the raise or voltage raising winding, the voltage in both cases being the voltage of the main synchronous condenser. These windings are on the axis of the load brushes of the machine and they produce a voltage betwen the quadrature axis brushes 9 and 10 which, due to the low resistance of the conductor 11, causes a very high current to circulate in the armature, thus producing a cross armature reaction flux which produces the main excitation of the machine and the output voltage between the load brushes 7 and 8.

For compensating the buck and boost generator for the armature reaction effect of current through the load brushes 7 and 8 it is provided with a compensating winding 14 on the load axis.

Both of the main control windings 12 and 13 are energized in accordance with the voltage of the condenser 1. As shown, they are connected to the secondary winding of a potential transformer 15 through individual rectifiers 16 and 17. A non-linear impedance in the form of a self-saturating iron core reactor 18 is connected in the input circuit of the rectifier 16 for the lowering winding 12 and a linear impedance in the form of a conventional resistor 19 is connected in the input circuit of the rectifier 17 for the raise control winding 13.

For limiting the amount of negative excitation which the automatic voltage regulating means can produce the buck and boost generator 6 is provided with a third control field winding 20 on its load axis. This winding is connected to be responsive to the negative excitation of the condenser and, as shown by way of example, it is connected across the main field winding 3 or across the exciter 4 through an electric valve or asymmetrical conductor 21. Device 21 is so connected that it prevents current from flowing through the control winding 20 when the excitation of the condenser is positive, that is to say, when the exciter 4 has the polarity indicated in the drawings.

In order to cause the current in the winding 20 to build up rapidly as the negative excitation voltage increases a non-linear impedance 22 is connected in series therewith. This may be a ceramic resistor of the type described and claimed in McEachron Patent 1,822,742 which is assigned to the assignee of the present application. This material has a characteristic defined by the equation $RI^a=C$ where R is its resistance, I is the current through it, $a$ is an exponent and C is a constant whose value depends on the physical dimensions of the resistor. This characteristic is such that the resistance falls off very rapidly with increases in current.

For biasing the negative excitation limit in accordance with terminal voltage a resistor 23 is connected in circuit with the winding 20 and a uni-directional current proportional to the terminal voltage of the condenser 1 is circulated through it by means of a rectifier 24 connected across the potential transformer 15. Thus, the voltage across the resistor 23 is proportional to the terminal voltage of the condenser and the rectifier 24 is so connected that the polarity of this voltage is such as to oppose the flow of current through the valve 21 in its conducting direction.

The driving means for the exciter 4 and the buck and boost generator 6 have not been illustrated because they may be of any well-known kind, such as separate motors, or a common motor, or event the synchronous condenser itself.

It should be, of course, be understood that in practice the voltage regulating system would ordinarily be provided with any well-known form of frequency compensation, temperature compensation, line drop compensation, anti-hunting means and polyphase response means as might be considered necessary. All of these are well-known regulator auxiliaries and as none of them constitute an essential feature of the present invention they have been omitted so as to simplify the description of the invention.

As the negative excitation limit circuit responds to the negative excitation voltage, rather than to the negative excitation current, it tends to operate before the current in the field winding 3 reaches a dangerously high negative value. This may sometimes be desirable but in case it is not the negative excitation limit can be made responsive to field current as in the modification in Fig. 2 wherein the response is obtained from the voltage drop in a series resistor 25. The voltage across this resistor is proportional to the field current and therefore the negative excitation limit will not start to act until the negative field current reaches the value to which it is to be limited.

The operation of the illustrated embodiments of the invention is as follows: The reactor 18 is so proportioned that its core is saturated when the voltage of the synchronous condenser is normal, and the resistor 19 is so proportioned that the current which it permits to flow in the raise winding 13 at normal voltage of the synchronous condenser will cause the ampere-turns of this winding to be numerically slightly less than the ampere-turns of the lowering winding 12. If these two windings have equal turns it then follows that their currents will be directly proportional to their ampere-turns and this is obviously the simplest arrangement. This relationship is shown graphically in Fig. 3 in which condenser voltage is plotted against control field current. The curve which corresponds in shape to the saturation curve of iron represents the non-linear relationship between current in the lowering winding 12 and condenser voltage. The straight line represents the linear relation between the current in the raise winding 13 and the condenser voltage. The point where these two lines intersect therefore corresponds to zero control excitation of the buck-boost generator 6 and therefore zero generated voltage of this machine. Consequently, the exciter 4 being a shunt machine would under these conditions tend to run up to its ceiling voltage which would be the voltage at which its own saturation characteristic intersected its field circuit resistance characteristic. This is obviously much too high an exciter voltage for normal synchronous condenser voltage and therefore the normal synchronous condenser voltage in Fig. 3 corresponds to a point which is slightly above the intersection of the two lines so that the ampere-turns of the lowering winding exceed the ampere-turns of the raise winding and the generator 6 has a bucking voltage with respect to the voltage of the exciter 4. It will be seen from Fig. 3 that the point on the saturation curve corresponding to normal synchronous condenser voltage is on the flat part of the curve which is almost horizontal so that very small changes in synchronous condenser voltage above and below normal will cause very large changes in the current in the lowering winding 12, the change being an increase in current for an increase in voltage and a decrease in current for a decrease in voltage. However, the current in the raise winding 13 is directly proportional to the condenser voltage. Therefore, the bucking voltage of the generator 6 increases rapidly if the condenser voltage rises above normal and it decreases rapidly if the condenser voltage falls below normal until at the intersection point of the two curves net excitation and hence the generated voltage of the buck-boost machine 6 becomes zero. If the synchronous condenser voltage falls still lower the polarity of the machine 6 reverses and it becomes a boosting instead of a bucking machine.

Figure 3:
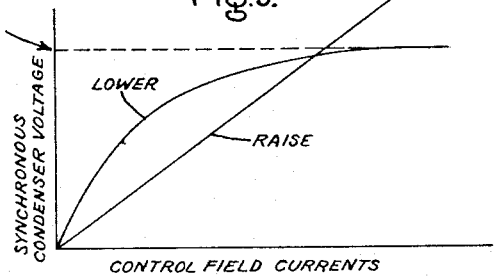
Figure 4:
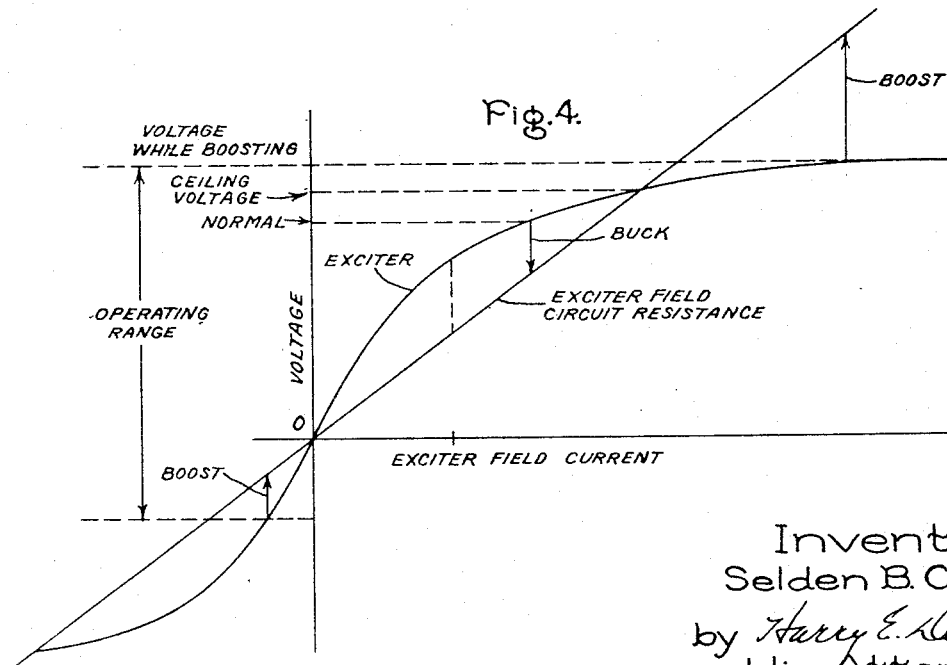
Figure 5:
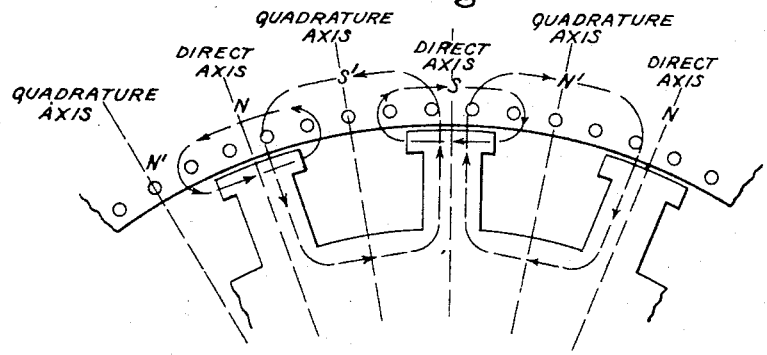

The effect of this action of the buck and boost generator 6 on the voltage of the exciter 4 is illustrated in Fig. 4 in which voltage is compared with exciter field current. The curved line is the saturation or magnetization characteristic of the exciter and has the same general shape as the saturation characteristic of the reactor 18 in Fig. 3. The straight line is the exciter field circuit resistance characteristic, that is to say, it represents the voltage drop in the resistance of the exciter field circuit (which circuit includes the resistance of the buck and boost generator 6) with variations in current in it. The intersection of these two lines corresponds to the normal ceiling voltage of the exciter, that is to say, it is the voltage at which the exciter is inherently stable and the voltage to which it inherently tends to rise if not prevented by some external means. Thus, for any voltage below this intersection point the generated voltage of the exciter exceeds the voltage drop in its field circuit so that its field current tends to rise, further increasing the voltage, and this action once begun by the residual magnetization of the machine will continue until the intersection point is reached. Beyond this point more voltage is required to force current through the resistance of the field circuit than the generator produces. In other words, for every increment of current in excess of the current corresponding to the intersection point the increase in resistance drop is greater than the increase in terminal voltage so, of course, the voltage cannot rise beyond the intersection point.

Normal exciter voltage which corresponds to normal synchronous condenser voltage is indicated in Fig. 4 as being on the knee or zone of the exciter saturation characteristic where its slope changes rapidly and this is between the intersection point and the origin of the curves. The downwardly pointing arrow labeled "Buck" between the point on the exciter voltage curve corresponding to normal voltage and the resistance characteristic at the value of field current which will give this normal voltage represents the magnitude of the bucking voltage of the machine 6 necessary to maintain stable operation at this point.

It therefore follows from a comparison of Figs. 3 and 4 that if the synchronous condenser voltage falls below normal the bucking voltage of the generator 6 decreases, thus permitting the exciter voltage to rise. This increases the excitation of the synchronous condenser causing it to operate overexcited and draw an increased amount of leading wattless current, which current in flowing through the reactance of the supply line for the condenser causes a rise in condenser terminal voltage. If the condenser voltage falls to the intersection point in Fig. 3 the voltage of the machine 6 will go to zero and the exciter voltage will rise to its normal ceiling value corresponding to the intersection of the curves in Fig. 4. If the condenser voltage falls still further the polarity of the machine 6 reverses and it becomes a booster as shown by the upwardly pointing arrow labeled "Boost" between the curves in Fig. 4 beyond their intersection point. It is therefore possible to obtain exciter voltage beyond the normal ceiling value by reason of the boosting action of the machine 6. This boosting voltage, as previously explained, represents the marginal amount of voltage above that of the exciter which is necessary to force the required amount of field current through the resistance of the field circuit.

If now the synchronous condenser voltage rises above normal the bucking voltage of the machine 6 increases, thereby lowering the voltage of the exciter and hence lowering the excitation of the condenser whereby it operates underexcited and draws lagging wattless current from the line so as to lower the condenser terminal voltage. This action will continue and the bucking voltage will continue to increase up to a value of voltage and field current corresponding approximately to the dotted vertical line between the two curves in Fig. 4. This represents the maximum value of bucking voltage. Beyond this point in the downward direction of exciter voltage the bucking voltage will decrease because of the fact that the exciter voltage is decreasing faster than the voltage drop in the field resistance.

In actual operation the regulator is extremely fast because very small net values of control excitation of the machine 6 in either direction cause this machine to go up to its ceiling value of voltage so that the regulator action is almost a dynamic action in which the value of voltage and current held by the regulator fluctuates extremely rapidly and in extremely minute amounts above and below the desired value. In other words, the regulator is always poised to act almost instantaneously to check any departures from the desired values.

If the condenser voltage still stays above normal the exciter voltage can be brought down to zero at which point the bucking voltage of the machine 6 will also be zero which, of course, is as it should be because there will then be no voltage for it to buck. Actually the above is not quite true because the residual voltage of the exciter must be reduced to zero before the exciter voltage can fall to zero and consequently it is necessary to provide some negative field current. This negative field current will, of course, be produced by the bucking voltage of the machine 6. However, the combination of the bucking voltage of machine 6 and a zero voltage of exciter 4 will reverse the polarity of machine 4 so that these two polarities will be in the same direction. This will tend to increase the negative excitation of the synchronous condenser very rapidly but as soon as the condenser voltage tries to fall below normal by reason of the increasing amounts of lagging wattless current which it draws, the polarity of the machine 6 is reversed so that it becomes a booster in the sense of the original polarity of this term and therefore it actually bucks the negative voltage of the exciter so that stable operation will be obtained even with negative values of excitation.

The reason that the synchronous condenser can continue to operate with negative excitation is that its synchronizing torque is the resultant of two torques, one of which is a so-called reluctance torque and the other of which is a torque which is proportional to its excitation. The reluctance torque $T_R$ is proportional to the square of the condenser voltage ($e^2$) and to the difference between the direct and quadrature axes components of the synchronous reactance of the machine ($X_d$ and $X_q$ respectively) and to the sine of twice the angular displacement of its rotor (sin $2\Delta$). Expressed mathematically in terms of per unit values $$T_R = \frac{e^2(X_d - X_q) \sin 2\Delta}{2 X_d \cdot X_q}$$

The direct and quadrature axis reactances are inversely proportional to the reluctance of the magnetic circuits through the rotor along its direct and quadrature axes. By the direct axis is meant the axis through the salient poles of the rotor. Thus, in Fig. 5 if the armature I produces magnetic poles which are in line with the axes of the rotor poles, as shown for example by the poles labeled N, S and N, then the flux in flowing from pole N to pole S will flow across one air gap, through one salient pole, through the main body of the rotor 2 and through the next salient pole and its air gap and back through the stator yoke. This is the reluctance path of the direct axis synchronous reactance $X_d$ of the machine. The distance between adjacent stator poles is 180 electrical degrees. Assume now that the stator poles advance 90 electrical degrees in the counterclockwise direction relative to the poles of the rotor so that the locations of these advanced poles will be N', S' and N'. This is the equivalent of having the rotor drop back 90 electrical degrees without displacing the stator poles. The reluctance of the magnetic path between adjacent stator poles will now be substantially higher because it has a longer air path, this new path being from N' through a longer air gap and then through the pole tips of the salient poles and back to S' through a long air gap, the circuit being completed through the stator yoke. This is the reluctance of the quadrature axis synchronous reactance $X_q$ and as this reluctance is higher than the reluctance of the direct axis reactance the direct axis reactance is higher than the quadrature axis reactance and in practice the quadrature axis reactance is usually about 0.6 of the direct axis reactance. In actual operation the rotor and stator poles are usually somewhere between being in line and being in quadrature so that the armature current is determined by both the direct and quadrature axis reactances.

Figure 6:
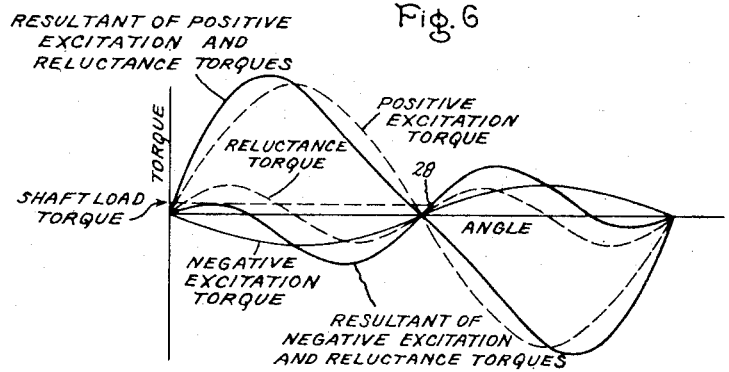

The reluctance torque of a given machine operating at a given voltage is shown in Fig. 6 as the sine curve labeled "Reactance torque." The ordinates of this curve are torque and its abscissae are the rotor angles. As will be seen, the torque rises to a maximum value at an angle of 45 degrees ($\pi/4$), becomes zero at 90 degrees ($\pi/2$) and then reverses so that it goes through two complete cycles in 360 electrical degrees ($2\pi$). The excitation torque of the machine in per unit terms $T_F$ is equal to the terminal voltage $e$ times the field current $I_f$ times the sine of the angle of displacement of the rotor divided by the direct axis reactance $X_d$. This is therefore another sine curve of half the frequency of the reluctance torque and is shown in Fig. 6 and labeled "Positive excitation torque." The normal synchronizing torque of the machine is therefore the sum of the reluctance and positive excitation torques and this resultant curve is also shown and labeled in the drawings. When the excitation of the machine becomes negative its excitation torque reverses and this is shown by the curve labeled "Negative excitation torque." The resultant synchronizing torque with negative excitation is the sum of the reluctance and negative excitation torque and the resultant of these two curves is also shown and labeled in Fig. 6. The horizontal dashed line slightly above the origin represents the shaft torque of the machine and the point where this horizontal torque line intersects the resultant torque curves gives the rotor angle at which the machine operates. In the case of normal positive excitation the angle is very small as the machine has a maximum synchronizing torque which is very much larger than the shaft torque. However, as negative excitation increases the maximum value of the resultant torque under conditions of negative excitation decreases so that a point is reached, as is illustrated in the drawings, in which the maximum torque under these conditions is less than the shaft torque with the resultant that the machine must slip a pole. This is therefore the limit of operation with negative excitation.

In order to prevent the machine from slipping a pole as the result of too much negative excitation the resistor 22 is so proportioned that as soon as either the negative excitation voltage, as in Fig. 1, or the negative excitation current as in Fig. 2, reaches its safe limit the resistance of 22 decreases rapidly so as to permit rapidly increasing amounts of current to flow through the negative excitation limiting control winding 20. The polarity of this winding is such as to increase the voltage of the generator 6 in its original boosting direction, that is to say, in the direction in which it is then acting, although, of course, relative to the negative polarity of the exciter this is actually a bucking voltage. The result is that the regulator is effectively checked from increasing the negative excitation beyond a predetermined limit.

Figure 7:
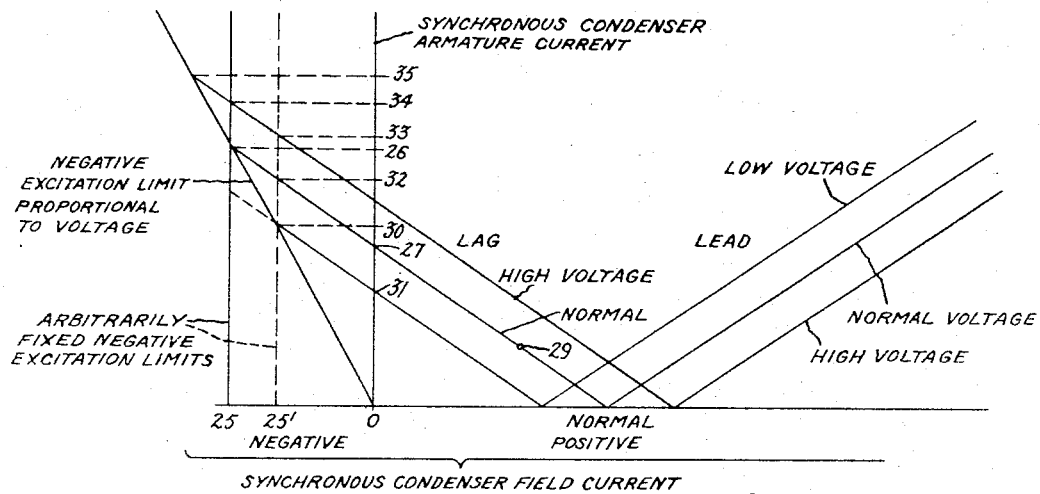

This action is illustrated in Fig. 7 with reference to a set of so-called V curves of the synchronous condenser. These curves neglect saturation and therefore are shown as straight lines and they also neglect losses so that they come down to zero armature current at normal values of excitation. For excitations above normal the armature current is leading and for excitations below normal the current is lagging, as indicated in the figure. Three curves are shown, one for normal voltage, one for high voltage, such, for example, as 10 per cent above normal, and one for low voltage, such, for example, as a voltage of 10 per cent below normal. Considering the normal voltage curve, suppose that point 25 is the limiting value of negative excitation beyond which the machine will pull out of step. This corresponds to a value of lagging current indicated by the point 26 which is substantially higher than the value of lagging current at zero excitation for this voltage which is indicated by the point 27. With negative excitation beyond point 25, the machine will slip a pole as explained in connection with Fig. 6.

If the machine slips back a pole there results an effective reversal of excitation because, as will be seen from Fig. 6, beyond the angle $\pi$, corresponding to 180 electrical degrees, the resultant torque curve with negative excitation intersects the shaft torque line at point 28 corresponding to a very small angle beyond $\pi$ and the operation will be stable because the negative excitation is now aiding the reluctance torque. This would correspond in Fig. 7 to sliding down the V curve to point 29 but as the current limit would prevent the negative excitation from increasing further the system would stick at that point 29, which, however, would be a perfectly stable point and would not cause excessive currents or other harmful operating effects. The magnitude of the field current at point 29 is the same as at the point 25.

However, there would be bound to come a time when conditions on the main circuit were such that the condenser voltage tried to fall instead of to rise. The automatic regulator would then act to reduce the negative excitation. However, as the machine has already slipped a pole, the regulator would be acting in the wrong sense so that the torque angle of the machine would increase and its resultant torque would decrease and the armature current would increase in the lagging direction instead of decreasing in the lagging direction. Consequently, the action would continue up the V curve from the point 29 until the stability limit was reached at the point where this V curve intersects the excitation current limit point whose coordinates are points 25 and 26. Slightly beyond this point the machine would slip back another pole, thus in effect restoring the various polarities to their original relations. The excitation would now be positive and the current would drop suddenly to the point 29 again and from there on it would drop further to its minimum value and then rise as leading wattless current until the tendency of the condenser voltage to fall had been checked, and, in fact, until the condenser voltage had returned almost exactly to its desired value as determined by the setting of the regulator. It will thus be seen that the system can itself regain control and it will not stay indefinitely at the point 29 when it first slips a pole.

As a practical matter, a fixed or arbitrary current limit should be adjusted so as to prevent the machine from falling out of step at the lowest operating voltage to be encountered. Such a current limit is shown by the dashed vertical line which sets the practical negative excitation current limit at point 25' corresponding to a lagging armature current of value 30. Although this is higher than point 31, corresponding to the maximum value of lagging current at zero excitation and low voltage, it nevertheless limits the maximum negative excitation armature current for normal voltage to the point 32 instead of to the point 26 and it limits the lagging armature current at high voltage to the point 33 instead of to the point 34.

I have found that the negative excitation current limit is a linear function of terminal voltage for any given machine, it being in per unit values equal to $$\frac{e(x_d - x_q)}{x_q}$$

Thus, at zero terminal voltage the negative excitation limit would be zero. For a typical machine $$\left(\frac{x_d - x_q}{x_q}\right)$$

is equal to two thirds of .67 so that the negative excitation current limit will be directly proportional to the terminal voltage but will have a value of about 50% the normal excitation at that voltage in order to take care of the rotational losses. This negative excitation limit is shown as the sloping line labeled "Negative excitation limit proportional to voltage."

Automatic achievement of such a voltage biased negative excitation limit is obtained by means of the resistor 23 and rectifier 24 which produces a voltage in the current limit circuit which is proportional to terminal voltage and which opposes the negative excitation voltage of the exciter. Consequently, the voltage of resistor 23 is the threshold beyond which the exciter voltage has to go in order for the negative excitation limiting means to go into action.

The result is that the amount of lagging armature current which can be obtained from the machine at normal voltage increases from point 32 to point 26 and for the case of high terminal voltage increases from the point 33 to the point 35. Consequently, the voltage control of the current limit permits substantial increases in lagging wattless current to be obtained from a given machine under all conditions of operating voltage in excess of the voltage for which a fixed negative current excitation limit was set for.

The negative excitation limit feature and the biasing of this negative limit in accordance with terminal voltage are of course independent of any particular type of excitation control system provided only that such control system can produce sufficiently high values of negative excitation as to cause loss of synchronism and consequently it should be understood that the invention is not limited to buck and boost generators or to compensated armature reaction excited exciter systems and that any other suitable excitation control system which can provide negative excitation may also be employed.

As the synchronous condenser 1 can be a standard salient pole machine and as the exciter 4 can be a standard exciter having a conventional field coil structure and as the buck and boost generator 6 normally supplies only the marginal amount of excitation of the exciter for maintaining constant synchronous condenser voltage, the entire system is relatively inexpensive and yet at the same time it is possible to obtain in a perfectly stable manner the maximum possible amount of lagging reactive power from the condenser without having it lose synchronism. In other words, by means of relatively inexpensive and largely standard control equipment the same synchronous condenser can be made to deliver in a perfectly safe and stable manner 50 to 60 per cent more lagging reactive power than can be obtained from a conventional condenser control system.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In combination, a synchronous condenser having substantial reluctance synchronizing torque, means for providing said condenser with negative excitation current so as to increase its lagging reactive power capacity, and cooperating means for limiting said negative excitation current to a predetermined value.

2. In combination, a synchronous condenser having substantial reluctance synchronizing torque, means for providing said condenser with negative excitation current so as to increase its lagging reactive power capacity, and cooperating means for limiting said negative excitation current to the maximum value which will permit synchronous operation of said condenser at various values of terminal voltage.

3. In combination, a synchronous condenser having substantial reluctance synchronizing torque, means for providing said condenser with negative excitation current so as to increase its lagging reactive power capacity, said negative excitation current also acting to reduce the resultant torque of said condenser, and means for preventing said negative excitation current from reducing said resultant torque below the operating torque of said condenser at all values of terminal voltage of said condenser.

4. In combination, a salient pole synchronous condenser having substantial reluctance synchronizing torque, means for providing said condenser with negative excitation so as to increase its lagging reactive power capacity, said negative excitation also acting to reduce the resultant torque of said condenser, said reluctance torque being proportional to the square of terminal voltage of said condenser, and means responsive to both the terminal voltage and the negative excitation of said condenser for permitting the existence of the maximum negative excitation which is consistent with the retention of the minimum resultant synchronizing torque which is necessary to prevent slipping a pole.

5. An automatic dynamo voltage regulator of the field excitation controlling type, said regulator opposing increases in voltage by decreasing field excitation, the range of decreasing field excitation extending through zero into the region of reversed field current, and means for limiting the amount of reversed field current in accordance with the value of an operating condition of said dynamo.

6. An automatic dynamo voltage regulator of the field excitation controlling type, said regulator opposing increases in voltage by decreasing field excitation, the range of decreasing field excitation extending through zero into the region of negative excitation, extreme values of said region of negative excitation being such as to cause instability, and automatic means for stabilizing said negative excitation at automatically varied limiting values.

7. An automatic dynamo voltage regulator of the field excitation controlling type, said regulator opposing increases in voltage by decreasing field excitation, the range of decreasing field excitation extending through zero into the region of negative excitation, and automatic non-linear means for limiting the amount of negative excitation said regulator can produce.

8. In combination, a salient pole synchronous condenser, an automatic voltage regulator therefor, said regulator being capable of reversing the excitation of said condenser so as to increase the amount of lagging wattless kilo-volt amperes in said condenser substantially above that corresponding to zero excitation, and means responsive to the condenser voltage for limiting the amount of reverse excitation of said condenser to the maximum amount said condenser can have at any particular value of voltage without losing synchronism.

9. In combination, an alternating-current power line, a synchronous condenser connected thereto, an automatic voltage regulator for said synchronous condenser, said regulator having an operating range including negative values of excitation of said synchronous condenser sufficient to cause it to slip a pole, means for automatically limiting the amount of negative excitation said synchronous condenser can have, and means for varying said limiting amount of negative excitation in accordance with the terminal voltage of said synchronous condenser.

10. In combination, an alternating-current power line, a synchronous condenser connected thereto, said condenser having a salient pole rotor, a direct-current field winding on said rotor, an automatic voltage regulator for said condenser, said regulator having a range of control which includes negative values of current in said field winding, automatic means for limiting the maximum value of said negative current, and means for changing said maximum value in accordance with the voltage of said condenser.

11. In combination, a synchronous condenser, a shunt connected exciter therefor, a compensated buck and boost armature reaction excited generator connected in the shunt field circuit of said exciter, a pair of opposed main control field windings on said generator connected to be energized in response to the voltage of said condenser, one of said field windings having a linear response to the condenser voltage and acting in the direction to make said generator a boosting generator, the other of said field windings having a non-linear response to the condenser voltage such that its current changes more than in direct proportion to changes in the condenser voltage and acting to make said generator a bucking generator, a third control field winding on said generator, and means for energizing said third control field winding only when the voltage of said exciter reverses.

12. In combination, a dynamo-electric machine, a field excitation system therefor for producing positive and negative values of excitation, and means including an electric valve and a non-linear impedance for limiting the negative excitation to a predetermined value.

13. In combination, a dynamo-electric machine, automatic regulating means therefor including means for producing positive and negative values of excitation of said machine, means for limiting the negative value of said excitation, an electric valve for preventing said last-mentioned means from operating when the excitation is positive and permitting it to operate when the excitation is negative, and a non-linear impedance connected to cause said negative excitation limiting means to be disproportionately responsive to negative excitation.

14. In combination, a synchronous condenser, an automatic voltage regulator system for said synchronous condenser including means for providing said synchronous condenser with negative excitation, a control winding for limiting the negative excitation of said condenser, an electric valve for connecting said control winding to be responsive only to negative values of excitation of said synchronous condenser, and means responsive to the voltage of said synchronous condenser for determining the value of negative excitation to which said limiting means responds.

15. In an automatic regulator system for a synchronous condenser, in combination, automatic means responsive to synchronous condenser voltage for controlling its excitation through a range which includes substantially negative values of excitation current, means for limiting the maximum value of said negative excitation current, and means responsive to an operating condition of said synchronous condenser for biasing said last-mentioned means so as to vary the value of said negative exciting current limit.

16. In an automatic voltage regulator for a synchronous condenser, in combination, means for operating said condenser with negative excitation so as to increase the lagging wattless current capacity thereof, and means for limiting said negative excitation to a value which is directly proportional to the voltage of said synchronous condenser.

17. An automatic regulator system for a synchronous condenser comprising, in combination, means responsive to the voltage of said condenser for controlling its excitation through a range which includes the substantial negative values of excitation current, and automatic means responsive to the magnitude of the said negative excitation for limiting it to a value which is proportional to terminal voltage of the synchronous condenser multiplied by $$\left(\frac{X_d - X_q}{X_q}\right)$$

where $X_d$ is the direct axis reactance of the condenser and $X_q$ is its quadrature axis reactance.

SELDEN B. CRARY.